Nov. 8, 1966   A. F. SCHOTT   3,283,420
CALCULATOR
Filed Nov. 14, 1962   3 Sheets-Sheet 1
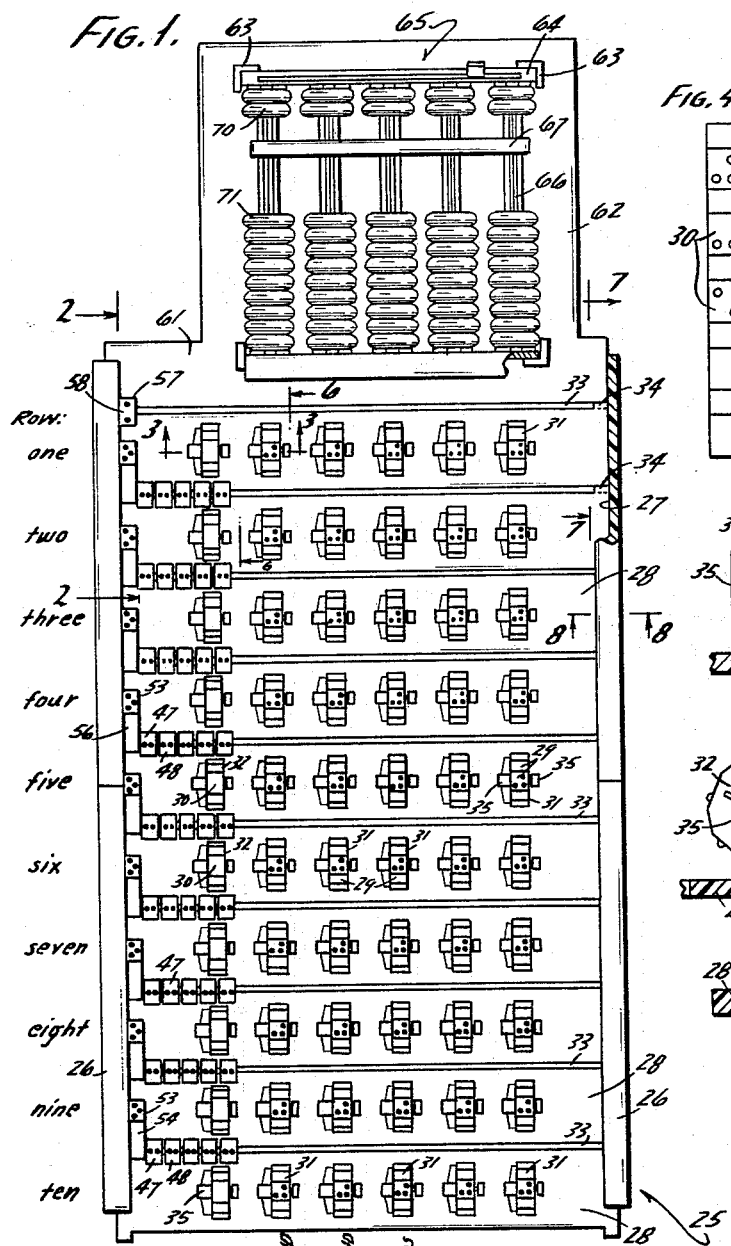
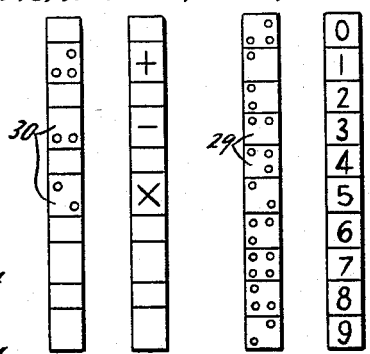
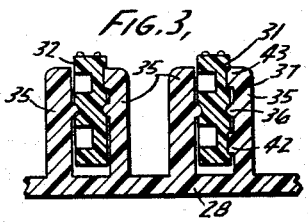
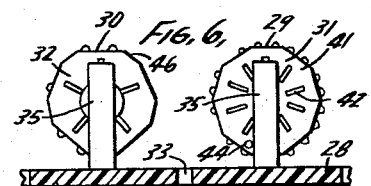
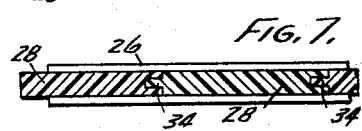
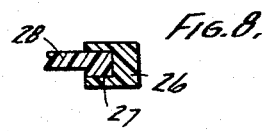
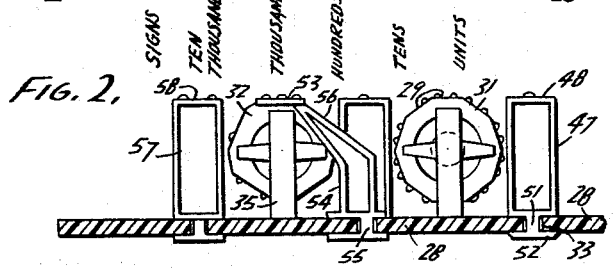
INVENTOR.
ANDREW F. SCHOTT
BY
Wheeler, Wheeler & Wheeler
ATTORNEYS.

Nov. 8, 1966  A. F. SCHOTT  3,283,420
CALCULATOR

Filed Nov. 14, 1962  3 Sheets-Sheet 2

INVENTOR.
ANDREW F. SCHOTT
BY
Wheeler, Wheeler & Wheeler
ATTORNEYS.

Nov. 8, 1966    A. F. SCHOTT    3,283,420
CALCULATOR

Filed Nov. 14, 1962    3 Sheets-Sheet 3

INVENTOR.
ANDREW F. SCHOTT
BY
Wheeler, Wheeler + Wheeler
ATTORNEYS.

United States Patent Office 3,283,420
Patented Nov. 8, 1966

3,283,420
CALCULATOR
Andrew F. Schott, Rte. 1, Green Lake, Wis.
Filed Nov. 14, 1962, Ser. No. 237,593
13 Claims. (Cl. 35—31)

This invention relates to a device useful in mathematical calculations and having its principal utility as a teaching tool. While the device lends itself particularly well to the teaching of the blind, it may also be used in teaching sighted persons.

The device of the present invention consists essentially of a matrix of indexable wheels or like elements, each wheel bearing on its periphery a plurality of numbers. Each wheel is indexable to dispose a selected number thereon in a sensible position in the matrix. The matrix in which the wheels are arranged desirably constitutes a grid pattern in which the wheels are disposed in columns and rows simulating conventional written mathematical notations. Where the numbers on the wheels are sensible to the eye, the device can be used by the sighted, as a substitute for pencil and paper and constitutes a recording and memory medium upon which mathematical problems and their solutions can be noted in the same conventional system used in written notation. Where used by the blind, the respective wheels are inscribed with Braille notations, thus to be sensible to the touch.

The device of the present invention is adapted for cooperative association with the abacus shown in my copending application Serial No. 816,558 filed May 28, 1959, now U.S. Patent 3,076,272. The columns of the numbered elements on the device of the present invention are aligned with corresponding columns of counters on the abacus. For this purpose the columns of the two devices have the same lateral spacing.

A sighted or blind student learning fundamental principles of arithmetic, including counting, addition, subtraction, multiplication and division, may utilize the abacus as described in my patent aforesaid to visualize the principles which are involved. He will perform the various steps of arithmetical computation as are appropriate and will use the device of the present invention in conjunction with the abacus to record in conventional arithmetical notation the problem to be solved, an estimated answer and the final solution evolved from use of the abacus. After the student has reached the point where problems can be solved mentally, the abacus may be removed from association with the calculator of the present invention. The calculator then functions primarily as a recording and memory medium.

The device of the present invention is also well adapted to set up a matrix of numbers, as in a multiplication table or the like. The student can use the device to set up a matrix, to any base, without need to refer to calculated tables of this type for which reference must be made to standard textbooks, etc.

Other objects, features and advantages of the invention will appear from the following disclosure in which:

FIGURE 1 is a plan view of a device embodying the invention, as used in conjunction with the abacus aforesaid.

FIGURE 2 is a fragmentary cross section taken along the line 2—2 of FIGURE 1.

FIGURE 3 is a cross section taken along the line 3—3 of FIGURE 1.

FIGURE 4 is a developed plan of the periphery of one of the wheels in the "signs" column of the device, as described in Braille with mathematical operational signs.

FIGURE 4a is a developed plan of a similar wheel inscribed in conventional arithmetic notation.

FIGURE 5 is a developed plan view of the periphery of one of the wheels in the numbered calculating columns of the device, inscribed in Braille from zero through nine inclusive.

FIGURE 5a is a developed plan view of a similar wheel inscribed in Arabic numerals from zero through nine inclusive.

FIGURE 6 is a cross section taken along the broken line 6—6 of FIGURE 1.

FIGURE 7 is a cross section taken along the line 7—7 of FIGURE 1.

FIGURE 8 is a cross section taken along the line 8—8 of FIGURE 1.

Figure 9:
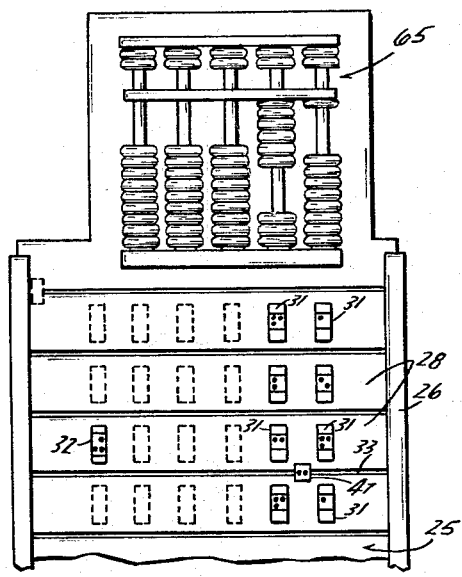
FIGURES 9 through 13 are diagrammatic views illustrating the solution of various arithmetic problems using the device shown in more detail in FIGURE 1.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

One embodiment of the invention, as shown in detail in FIGURE 1, includes a base 25 which may conveniently be made up of plastic structural members consisting of marginal slide ways 26 which have inwardly facing grooves 27 which receive in initially slidable relationship the cross panels 28, each of which functions as a base for a row including five numbered elements 31 and one signed element 32. The numbered elements 31 are desirably in the form of wheels having their peripheries formed in polyhedron configuration. Where a number system to the base ten is used, as herein specifically illustrated, each wheel 31 has ten faces 29. As indicated in FIGURES 5 and 5a the faces 29 are inscribed with numbers from zero through nine inclusive. These numbers may be inscribed in Arabic notation as shown in FIGURE 5a, or in Braille as shown in FIGURE 5.

Each panel 28 has five such numbered wheels 31 and one additional wheel 32, which may also have a periphery of polyhedron configuration, but in which the respective inscribed faces 30 of the wheel are inscribed with mathematical operational signs as shown in conventional mathematical notation in FIGURE 4a, and in Braille notation as shown in FIGURE 4.

Ten of the cross panels 28 are assembled with their end margins in the channels 27 of the slide ways 26 with a slight spacing or slot 33 laterally separating each panel 28. At their extreme ends each panel 28 is widened somewhat and is provided with tongue and groove interlocking connections as shown at 34 in FIGURE 7.

The panels 28 and slide ways 26 may be cemented together. If desired, the cement may be omitted in which case the parts are held together by friction subject to ready disassembly.

The respective wheels 31, 32 are mounted on their panels 28 on plastic yoke arms 35 a pair of which embrace each wheel. The yoke arms are provided with inwardly projecting jack axle projections 36 which fit into complementary sockets 37 formed in the side walls of the wheels 31, 32. Accordingly, the wheels 31, 32 are mounted for rotation on horizontal axes. The yoke arms 35 are made of resilient plastic, such as nylon or polystyrene, so as to be yieldable apart for ready removal of the embrace wheel. Accordingly, wheels with different type and style of indicia may be readily substituted one for the other.

All of the wheels 31 have their periphery formed in polyhedron configuration. Where a number system to the base ten is used, the periphery of each wheel 31 has ten flat faces 29 on which the numbers zero through nine inclusive are sensibly inscribed, as indicated in FIGURES 5 and 5a.

Each wheel 31 is indexable into ten definite positions in which one or the other of its faces 29 is at the top of the wheel and is horizontal. In this position Arabic numbers such as are shown in FIGURE 5a are readily visible to a sighted person and Braille numbers as shown in FIGURE 5 are horizontally beneath a blind persons's fingers to be sensed by touch. Detent means are provided to yieldably hold the wheel 31 in any one of the ten positions to which it is manually turned. One side 41 of which each wheel 31 is provided with ten sockets 42 which successively align with a ball 43 on one of the arms 35 of its yoke. The resilient bias of the arms 35 causes the ball 43 to ratchet into and out of the sockets 42 as the wheel 31 is turned manually, thus to impositively position the wheel 31 at an indexable position in which a selected numbered face 29 thereof is sensible to the user.

The side 41 of the wheel 31 is also provided with a laterally projecting stop 44 which abuts against arm 35 when the wheel has been turned to its extreme counter-clockwise position, as shown in FIGURE 6, where the number zero is uppermost. Accordingly the user can simply manually turn each wheel 31 to its extreme counter-clockwise position, as shown in FIGURE 6, in order to "clear" the device and to register all of the counters 31 at zero.

As before indicated, the counting wheels 31 are arranged in a matrix useful for recording arithmetic calculations. The preferred form of matrix is that of a grid pattern in which the counters 31 are disposed in columns respectively labeled in FIGURE 1 as units, tens, hundreds, thousands and ten thousands. Additional columns may optionally be provided. The number of rows, each comprising one of the panels 28, is generally immaterial, except when the device is intended for teaching children how to count numbers, in which case ten rows are necessary if a number system to the base ten is used. In the device shown in FIGURE 1 the respective rows are numbered one to ten inclusive. Where a number system to a base other than the base ten is used an appropriately different number of rows would be provided. For teaching purposes the embodiment shown in FIGURE 1 has proven ideal.

The grid pattern herein disclosed is also adaptable to the notation of arithmetic problems and their solutions in the same order as in pencil and paper notations. This is of great assistance to the student, whether he be sighted or blind.

The turning wheels 32 align at one side of the matrix in a column which is labeled in FIGURE 1 as "Signs." Wheels 32 may also have a polyhedron peripheral configuration, although the precise configuration is not critical. In the embodiment shown only three of the mathematical operational signs, namely the addition, the subtraction and the multiplication signs are inscribed on selected faces 30 of the wheel 32. FIGURES 4 and 4a show the Braille and mathematical notations for these operational signs. To give more room for these signs the faces 30 upon which they are inscribed are made larger than the intervening faces 46, although this is merely a matter of convenience and assists the blind person in readily distinguishing wheels 32 from wheels 31.

The "equals" sign 48 is inscribed upon the tops of posts 47 which are slidable along the slots 33. Each post 47 has a neck 51 downwardly projecting through slot 33. The bottom end of neck 51 has an enlarged head 52 to hold the post in sliding connection with the slot 33, as best shown in FIGURE 2.

While only one "equals" sign would be necessary for each slot 33, it is sometimes desirable to have a plurality of such signs. In the embodiment shown there are five posts 47 for each slot 33. These are normally stored at the extreme left of the base 25, as shown in FIGURE 1.

Figure 12:
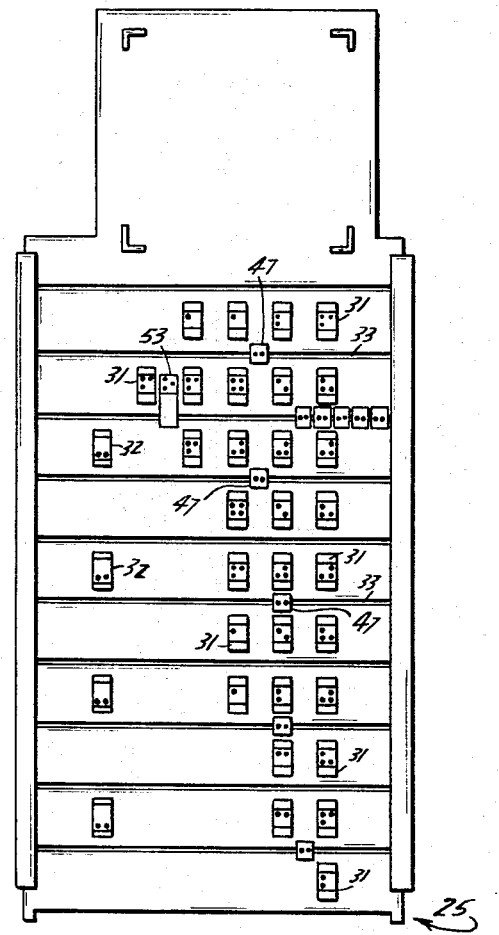

The "division" sign 53 is mounted on shiftable posts 54 which also have headed necks 55 slidable in slots 33. In order to place the division sign between appropriate wheels 31 in the same row, posts 54 have obliquely extending arms 56. This will place the division sign in the appropriate place in the matrix for the solution of a problem in division, as is illustrated in FIGURE 12. As is clear from FIGURE 2, the respective posts 47, 54 raise the operational signs to the same level as the uppermost faces of wheels 31, 32. This is highly desirable when the student is blind.

The slot 33 at the end of the base nearest abacus 65 is provided with a sliding post 57 upon which is inscribed in Braille the decimal point sign 58. Accordingly when the post 57 is moved to a position in its slot 33 intermediate the "tens" and "hundreds" columns, the device will be set up for the solution of problems to two decimal places, for example, problems involving our monetary system in dollars and cents.

The endmost cross panel 61 is provided with a laterally projecting plastic base 62 with upstanding angle brackets 63 into which legs 64 of abacus 65 are releasably mounted. The abacus 65 is desirably of the construction shown in my copending patent aforesaid. It has five slide bars or columns 66, each one of which is aligned with one of the wheel columns on base 25. There is a cross divider or stop 67 intermediate the ends of the slide rods 66. The slide rods 66 are provided at one side of stop 67 with two counters 70 and at the other side of the stop 67 with nine counters 71. Detailed description of the operation of the abacus 65 will not be repeated here, reference being made to my co-pending patent aforesaid for such explanation.

In its most elementary form the device of the present invention can be used by elementary school children in the lower grades to learn how to count numbers and to learn the relationship between numbers, even before they can write. Because of the matrix in which the counting wheels 31 are disposed, a child can count from zero to ten thousand simply by manually turning the respective counters in the various rows and columns. The theory of transposition of numbers from column to column can also be learned readily and the child has a sensible instrument to help formulate these theories. Because of the optional inscribing of Arabic or Braille number notations on the counters 31, the device may be used with equal facility by the sighted and the blind.

By way of example, the solution of a few simple arithmetic problems will now be outlined to illustrate various uses to which the device can be put.

FIGURE 9 is a fragmentary showing of the device together with the abacus showing in Braille the notations, the position of the wheels 31, 32 and the position of the respective mathematical operational signs for the solution of the problem 25 plus 36 equals 61. The student will set up the problem in the appropriate columns of rows two and three of the device, leaving row one to record his estimated answer. The counter 32 in the "signs" column in row three will be turned to the plus sign as indicated in FIGURE 9. All other counters in the "signs" column will be cleared. Accordingly in FIGURE 9 row two reads 25 in the tens and units columns and row three reads 36 in the tens and units columns. Before the child develops sufficient skills to estimate an answer, row one will be left cleared with all counters showing zero.

The child will then use the abacus 65 as described in the co-pending application aforesaid, to add 25 and 36 and read the answer 61 therefrom. The position of the counters on the abacus with the answer 61 recorded thereon is shown in FIGURE 9. The student then records the sum 61 in row four as illustrated. The student also positions the equal sign between the third and fourth rows as is also illustrated in FIGURE 9.

Conventional Arabic written notation equivalent to the

Braille notations shown in FIGURE 9 (except for estimated answer) is:

```
   25
  +36
  ---
   61
```

Figure 10:
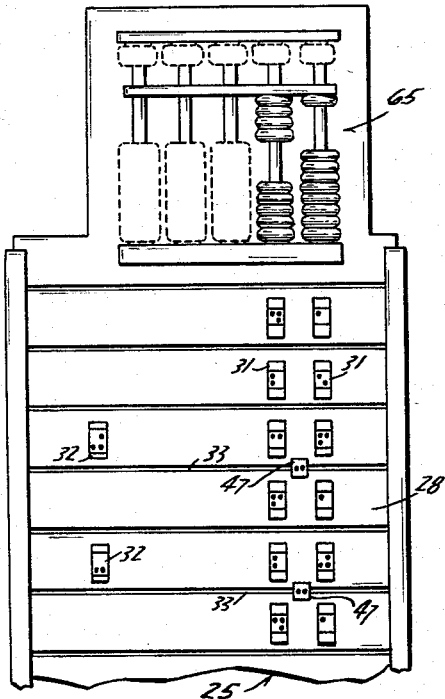

FIGURE 10 illustrates a further operation in which the number 20 is subtracted from the sum 61 of the preceding problem. As indicated in this figure, counter 32 in the signs column in row five is turned to its subtraction notation and the number 20 is set up in the tens and units columns in row five. The student may record his estimated difference 41 in row one and may then perform the operation of subtracting 20 from 61 on the abacus 65, the solution 41 appearing on the abacus in this figure. The student then records the difference 41 in row six illustrated and also positions the equals sign between rows five and six.

Conventional Arabic written notation equivalent to the Braille notations shown in FIGURE 10 (except for estimated answer) is:

```
   25
  +36
  ---
   61
  -20
  ---
   41
```

After the student has achieved sufficient arithmetic skills as to no longer require the abacus, it may be removed from its platform 62 and the student may then use the device as a substitute for pencil and paper to make notations of the problem, solve the problem mentally and record the answer.

Figure 11:
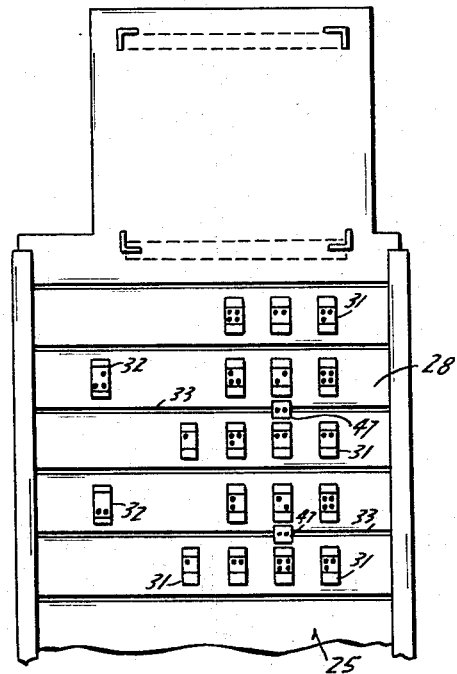

FIGURE 11 illustrates the use of the device to solve a problem in the absence of the abacus. FIGURE 11 illustrates a two-step problem in which the first step is to add 897 to 736, yielding the sum of 1,633. The second step in the problem is to subtract 257 from the intermediate sum, with the final answer of 1,376.

```
    736
   +897
   ----
  1,633
   -257
   ----
  1,376
```

FIGURE 12 illustrates all of the steps used to divide 6 into 6,758. For this purpose the dividend 6,758 is recorded on row two of the device, the division sign on post 54 in the slot 33 between rows two and three is moved to its position shown in FIGURE 12 and the divisor 6 is recorded in the ten thousand column in row two. The quotient will progressively appear in row one in the course of solving the problem. The student will perform each step of the problem, in the course of which he will set up the appropriate mathematical signs in the "signs" column. FIGURE 12 shows the Braille notations. Conventional Arabic written notations equivalent thereto is as follows:

```
       1126
    6/6758
     -6000
     -----
      758
      600
      ---
      158
     -120
     ----
       38
      -36
      ---
        2
```

The device is also useful to establish matrices for number systems of different bases and to establish arithmetic patterns of any type desired. These include applications in modular arithmetic in which there are repetition of patterns of numbers.

Figure 13:
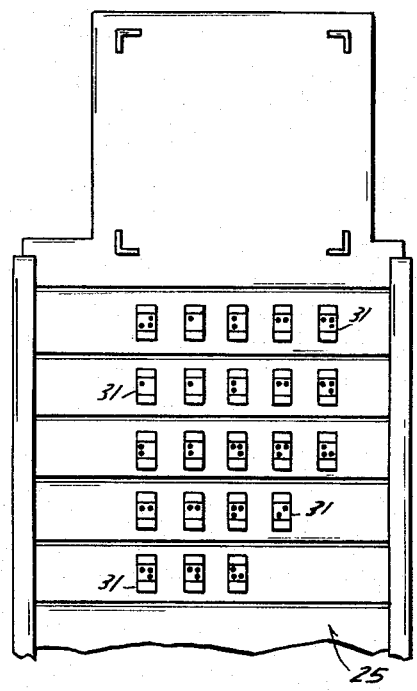

FIGURE 13 illustrates a simple multiplication table matrix in which the Braille notations on the counters 31 are set in a multiplication table matrix identical with the following matrix in which corresponding Arabic numerals are used:

```
  0  1  2  3  4
  1  1  2  3  4
  2  2  4  6  8
  3  3  6  9
  4  4  8
```

It is clear from the foregoing that any arithmetic problem which can be solved with a pencil and paper can be solved on the device of the present invention, either with or without the abacus. The numbers of rows and columns of wheels can be varied to suit the complexity of the problems and the base of the number system with which the student is working.

I claim:
1. A calculator matrix for successively recording arithmetic notations in the course of calculating in a given system of numbers to the same base and comprising:
 (a) a base,
 (b) a plurality of indexable elements arranged on said base in a fixed pattern of columns and rows and in which the indexable elements in successive rows are related spatially to the elements in preceding rows to simulate written arithmetic notation as elements of successive rows are successively indexed in the course of calculating in said system of numbers,
 (c) each of the indexable elements in the pattern having inscribed thereon identical sets of number notations in said given system of numbers to the same base,
 (d) and means for mounting each such element on said base and on which each such element is individually indexable to dispose a selected number notation of said system in a sensible position in the position which said element occupies in said fixed pattern.
2. The calculator matrix of claim 1 in which the number notations on said elements are inscribed in Braille notation.
3. The calculator matrix of claim 1 in which the number notations on said elements are inscribed in Arabic notation.
4. The calculator matrix of claim 1 in combination with an abacus bearing columns of shiftable counters, and means mounting said abacus with its columns longitudinally aligned with the columns of said pattern.
5. A device of the character described comprising a base, a plurality of indexable elements arranged on said base in a fixed pattern of columns and rows useful in arithmetic notation in the course of calculating in a given system of numbers to the same base, each of the indexable elements in the pattern having inscribed thereon identical sets of number notations in said given system of numbers to the same base, and means for mounting each such element on said base and on which each such element is individually indexable to dispose a selected number notation of said system in a sensible position in the position which said element occupies in said fixed pattern, in structural combination with members bearing operational mathematical signs and means for shiftably mounting said members on said base so that said members are shiftable between adjacent rows in the course of said arithmetic calculations.
6. A device of the character described comprising a base, a plurality of indexable elements arranged on said base in a fixed pattern of columns and rows useful in arithmetic notation in the course of calculating in a given system of numbers to the same base, each of the indexable elements in the pattern having inscribed thereon identical sets of number notations in said given system of numbers to the same base, and means for mounting each such element on said base and on which each such element is individually indexable to dispose a selected number nota- tion of said system in a sensible position in the position which said element occupies in said fixed pattern, in combination with another column of indexable elements in said pattern, each element of said other column bearing a plurality of mathematical operational signs and means for mounting said other elements and on which said other elements are indexable to dispose a selected sign thereon in a sensible position.

7. The device of claim 6 in which said elements comprise polyhedron wheels having substantially flat faces on their periphery on which said numbers are inscribed.

8. The device of claim 7 in which said base is provided with posts having top faces on which sensible mathematical signs are inscribed, and mounting means on which said posts are shiftable on said base with respect to said columns, the indicia sensible on said wheels and posts being inscribed in Braille and being disposed at the same level.

9. In a device of the character described
   (a) an indexable wheel,
   (b) a plurality of indicia inscribed about the circumference of the wheel,
   (c) mounting means on which the wheel is rotatable,
   (d) said mounting means comprising a yoke having pivot means on which the wheel turns,
   (e) and detent means between the yoke and the wheel to define a plurality of positions of the wheel in which the respective indicia is sensible, said yoke having arms resiliently yieldable apart, said detent means comprising ball and socket means on said yoke and wheel, said ball and socket means being yieldably held in engagement by the resilient bias of said yoke arms and being releasable on turning the wheel with respect to the yoke.

10. A calculator matrix for successively recording arithmetic notations in the course of calculating in a given system of numbers to the same base and comprising:
    (a) a base comprising:
        (1) marginal channels,
        (2) cross panels having their ends engaged in said channels,
        (3) said cross panels being laterally spaced to leave slots therebetween,
    (b) a series of indexable elements on each cross panel,
    (c) each element bearing a plurality of number notations in the same system of numbers to the same base,
    (d) each cross panel constituting a single row in a fixed grid pattern,
    (e) corresponding elements in each row being aligned in columns in said fixed grid pattern,
    (f) the said indexable elements in successive rows being related spatially to the elements in preceding rows to simulate written arithmetic notation as the elements of successive rows are successively indexed in the course of calculating in said system of numbers.

11. A device of the character described comprising:
    (a) a base comprising:
        (1) marginal channels,
        (2) cross panels having their ends engaged in said channels,
        (3) said cross panels being laterally spaced to leave slots therebetween,
    (b) a series of indexable elements on each cross panel,
    (c) each element bearing a plurality of number notations in the same system of numbers to the same base,
    (d) each cross panel constituting a single row in a fixed grid pattern,
    (e) corresponding elements in each row being aligned in columns in said fixed grid pattern, in combination with posts slidable in the slots between cross panels and mathematical signs inscribed on said posts.

12. The calculator matrix of claim 10 in combination with an abacus having counter columns aligned longitudinally with the columns of said elements.

13. The calculator matrix of claim 10 in combination with another indexable element on each cross panel aligned in another column in said grid pattern, and mathematical signs inscribed on said other indexable element.

References Cited by the Examiner

UNITED STATES PATENTS

| | | | |
|---|---|---|---|
| 422,612 | 3/1890 | Neuhaus | 35—33 |
| 457,204 | 8/1891 | Klauser | 235—117.1 |
| 488,625 | 12/1892 | Clark | 35—77 X |
| 1,857,902 | 5/1932 | Weber | 273—143.5 |
| 2,371,325 | 3/1945 | Wessborg | 35—35.1 |
| 2,646,631 | 7/1953 | Lazar | 35—33 |
| 2,654,164 | 10/1953 | Seidenberg | 35—33 |

FOREIGN PATENTS

| | | |
|---|---|---|
| 1,114,418 | 12/1955 | France. |
| 379,571 | 9/1932 | Great Britain. |

EUGENE R. CAPOZIO, *Primary Examiner.*

GEORGE A. NINAS, JR., JEROME SCHNALL, CHARLES A. WILLMUTH, *Examiners.*

W. GRIEB, *Assistant Examiner.*